US012256133B2

(12) United States Patent
Doucet et al.

(10) Patent No.: US 12,256,133 B2
(45) Date of Patent: Mar. 18, 2025

(54) TERAHERTZ IMAGING SYSTEM WITH EVANESCENT-WAVE COUPLING

(71) Applicant: INSTITUT NATIONAL D'OPTIQUE, Quebec (CA)

(72) Inventors: Michel Doucet, Quebec (CA); Alain Bergeron, Quebec (CA); Francis Genereux, Quebec (CA); Hassane Oulachgar, Quebec (CA); Marc Terroux, Quebec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 248 days.

(21) Appl. No.: 18/040,699

(22) PCT Filed: Sep. 8, 2021

(86) PCT No.: PCT/CA2021/051233
§ 371 (c)(1),
(2) Date: Feb. 6, 2023

(87) PCT Pub. No.: WO2022/051842
PCT Pub. Date: Mar. 17, 2022

(65) Prior Publication Data
US 2023/0328340 A1    Oct. 12, 2023

Related U.S. Application Data

(60) Provisional application No. 63/077,209, filed on Sep. 11, 2020.

(51) Int. Cl.
*H04N 23/13*    (2023.01)
*G01N 21/3581*    (2014.01)
(Continued)

(52) U.S. Cl.
CPC ......... *H04N 23/13* (2023.01); *G01N 21/3581* (2013.01); *G02B 1/11* (2013.01);
(Continued)

(58) Field of Classification Search
CPC ...... H04N 23/13; G01N 21/3581; G02B 1/11; G02B 3/02; G02B 7/003; G02B 27/56;
(Continued)

(56) References Cited

U.S. PATENT DOCUMENTS 5,355,425 A * 10/1994 Braiman ............... G02B 6/4298
385/12
5,770,856 A    6/1998 Fillard
(Continued)

FOREIGN PATENT DOCUMENTS

WO    WO-9406043 A1 *  3/1994  .......... G01N 21/552

OTHER PUBLICATIONS

Meixner et al., "Direct measurement of standing evanescent waves with a photon-scanning tunneling microscope" Applied Optics, vol. 33, No. 34—Dec. 1, 1994.

*Primary Examiner* — Hung H Lam
(74) *Attorney, Agent, or Firm* — KDW Firm PLLC (57) ABSTRACT

An imaging system that includes an image sensor and imaging optics is provided. The image sensor has a sensing surface and it captures images of a scene. The imaging optics is optically coupled to the image sensor and is configured to form the images of the scene onto the sensing surface of the image sensor. The imaging optics includes a sensor-adjacent optical element having an exit surface located in close proximity to the sensing surface of the image sensor. The exit surface of the sensor-adjacent optical element and the sensing surface of the image sensor are spaced apart by a gap having a gap width enabling evanescent-wave coupling from (Continued)

the exit surface to the sensing surface for light having wavelengths within the sensor spectral range.

14 Claims, 6 Drawing Sheets

(51) Int. Cl.
*G02B 1/11* (2015.01)
*G02B 3/02* (2006.01)
*G02B 7/00* (2021.01)
*G02B 27/56* (2006.01)
*G02B 3/00* (2006.01)

(52) U.S. Cl.
CPC ............... *G02B 3/02* (2013.01); *G02B 7/003* (2013.01); *G02B 27/56* (2013.01); *G02B 2003/0093* (2013.01)

(58) Field of Classification Search
CPC ............ G02B 2003/0093; G01J 1/0411; G01J 1/4228; G01J 2001/4295
See application file for complete search history.

(56) References Cited

U.S. PATENT DOCUMENTS

| | | | |
|---|---|---|---|
| 6,211,532 B1 | 4/2001 | Yagi | |
| 7,423,753 B1* | 9/2008 | Chiang | ................ G01N 21/648 356/417 |
| 2010/0129854 A1* | 5/2010 | Fang | ................ G01N 33/54373 435/29 |
| 2013/0040331 A1* | 2/2013 | Fang | .................. G01N 33/6872 435/29 |

* cited by examiner

TERAHERTZ IMAGING SYSTEM WITH EVANESCENT-WAVE COUPLING

CROSS-REFERENCE TO RELATED APPLICATIONS

This is a National Stage Application, filed under 35 U.S.C. 371, of International Patent Application No. PCT/CA2021/051233, filed on Sep. 8, 2021, which claims the benefit of and priority under 35 U.S.C. § 119 to U.S. provisional patent application Ser. No. 63/077,209 filed on Sep. 11, 2020, the entirety of which applications are incorporated by reference herein for all purposes.

TECHNICAL FIELD

The technical field generally relates to imaging systems and more particularly concerns imaging systems and optics using evanescent-wave coupling to improve resolution.

BACKGROUND

The detection of light in the terahertz and neighboring optical frequencies opens the door to several imaging applications. Radiation in this region of the electromagnetic spectrum can usefully traverse solid matter and materials, allowing to see through walls, people's clothings, brownout, etc. The transmission spectra of the earth's atmosphere and of natural obscurants such as fog or snow also inherently provide transmission windows for long wavelengths such as millimeter waves (broadly corresponding to terahertz frequencies) and the like, providing an opportunity for imaging objects through the background of a scene.

Even for an imaging system free from any geometric aberrations (perfect optical system), the image of a point object is not a point, but a spot which generally consists of a bright core surrounded by rings or side lobes whose brightnesses decrease as we move away from the core. This is due to the phenomenon of diffraction. Diffraction is unavoidable in an imaging system due to the finite size of its optical elements and of the aperture stop that truncates the light beam propagating in the system. The minimum distance between two adjacent object points of a scene for which their corresponding images produced by an imaging system can be interpreted as two distinct elements is called the resolution of the imaging system. Geometric aberrations degrade the resolution in the sense that it increases the minimum distance between resolvable adjacent points. Diffraction imposes an intrinsic limit on the resolution of an imaging system called the limiting resolution. The limiting resolution is the absolute minimum distance between resolvable points when diffraction is the only limiting factor for the resolution. The resolution is defined in the scene, but it can be transposed to the image side through the magnification factor of the imaging system. According to the reversibility principle, the image side limiting resolution (transposed from the object) is the resolution of the imaging system would have if it was used to propagate light in the opposite direction.

The limiting resolution in the image space of an imaging system depends only on diffraction and is proportional to the wavelength of the light and inversely proportional to the numerical aperture of the system in the image space. A challenge of terahertz imaging and the like is that the long wavelengths lead to large values for the limiting resolution, which implies a greater distance between resolvable points in a scene, as compared for example to imaging systems using visible light. This results in large diffraction spots with low resolution. Without changing the imaging wavelength, the only parameter that can be controlled to improve the resolution is the image space's numerical aperture (NA) of the imaging system (and consequently also the object space's NA). However, using optics with a large numerical aperture presents its own issues. Lenses and other optical elements having large NA's can be challenging to manufacture. Furthermore, the resulting large acceptance angle increases the angles of incidence of the rays at the optical interfaces of the optical train and calls for careful designs of the optical surfaces to avoid total internal reflections at some optical interfaces.

There remains a need for improvements in the resolution of terahertz imaging systems and the like.

SUMMARY

In accordance with one aspect, there is provided an imaging system for imaging a scene, comprising:
- an image sensor for capturing images of the scene from light having wavelengths within a sensor spectral range, the image sensor having a sensing surface; and
- an imaging optics optically coupled to the image sensor and configured to form the images of the scene onto the sensing surface of the image sensor, the imaging optics comprising a sensor-adjacent optical element having an exit surface located in close proximity to the sensing surface of the image sensor;
- wherein the exit surface of the sensor-adjacent optical element and the sensing surface of the image sensor are spaced apart by a gap having a gap width similar to or smaller than a penetration distance of evanescent-waves for light having wavelengths within the sensor spectral range, thus enabling a transfer of optical power from the exit surface to the sensing surface by evanescent-wave coupling.

In some implementations, the image sensor is an array of micro-bolometers.

In some implementations, the sensor spectral range comprises wavelengths corresponding to optical frequencies in the terahertz range.

In some implementations, the sensor spectral range encompasses wavelengths from about 0.1 mm to about 30 mm.

In some implementations, the imaging optics includes a train of optical elements, a last optical element of said train of optical elements defining the sensor-adjacent optical element.

In some implementations, the exit surface is flat and extends parallel to the sensing surface of the image sensor.

In some implementations, the sensor-adjacent optical element comprises a lens having a flat surface on a side of the image sensor and a truncated ball profile on a side opposite to said image sensor.

In some implementations, the gap width is smaller than a critical depth of penetration of the evanescent-waves.

In some implementations, the sensor-adjacent optical element is made of a material having a refractive index higher than about 2 for light having wavelengths within the sensor spectral range.

In some implementations, the sensor-adjacent optical element comprises an anti-reflection coating deposited on the exit surface.

In some implementations, the imaging system further comprises a packaging assembly housing the image sensor, the packaging assembly comprising an opening aligned with the sensing surface.

In some implementations, the sensor-adjacent optical element is affixed to the packaging assembly so as to seal said opening.

In some implementations, the sensor-adjacent optical element is a compound optical element comprising a sensor window affixed to the packaging assembly so as to seal said opening, and a lens of the imaging optics affixed to said sensor window and forming a continuous light path therewith.

In some implementations, the sensor-adjacent optical element is a compound optical element comprising:
- a prismatic assembly comprising a wedge-shaped sensor window having a flat surface parallel to the sensing surface of the image sensor and affixed to the packaging assembly so as to seal said opening, and a wedged plate slidably engaging the wedge-shaped sensor window along respective angled surfaces thereof; and
- a lens affixed to the wedged plate along a flat surface thereof parallel to the sensing surface of the image sensor;
- whereby the lens and the prismatic assembly form a continuous light path.

In accordance with another aspect, there is provided an imaging system including an image sensor having a sensing surface, and imaging optics configured to focus light from a scene onto the image sensor. The imaging optics includes an optical train of optical elements, and has an exit surface closest to the image sensor. The exit surface of the imaging optics and the sensing surface of the image sensor are positioned in close proximity and are separated by a gap having a gap width favoring evanescent-wave light coupling between the exit surface and sensing surface.

In accordance with another aspect, there is also provided evanescent-wave coupling imaging optics for use with an imaging system.

The evanescent-wave coupling imaging optics described herein may be of use in conjunction with bolometric image sensors but can also be used with any type of sensors. Furthermore, the imaging systems described herein and associated imaging optics are of particular interest in the context of Terahertz imaging, but may be adapted for imaging in other parts of the electromagnetic spectrum.

Other aspects and features will be better understood upon a reading of preferred embodiments with reference to the appended drawings.

DETAILED DESCRIPTION

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the present description, the term "about" means within an acceptable error range for the particular value as determined by one of ordinary skill in the art, which will depend in part on how the value is measured or determined, i.e. the limitations of the measurement system. It is commonly accepted that a 10-20% precision measure is acceptable and encompasses the term "about".

In the present description, when a broad range of numerical values is provided, any possible narrower range within the boundary of the broader range is also contemplated. For example, if a broad range value from 0 to 1000 is provided, any narrower range between 0 and 1000 is also contemplated. If a broad range value from 0 to 1 is mentioned, any narrower range between 0 and 1, i.e. with decimal value, is also contemplated.

Imaging System

Figure 1A:
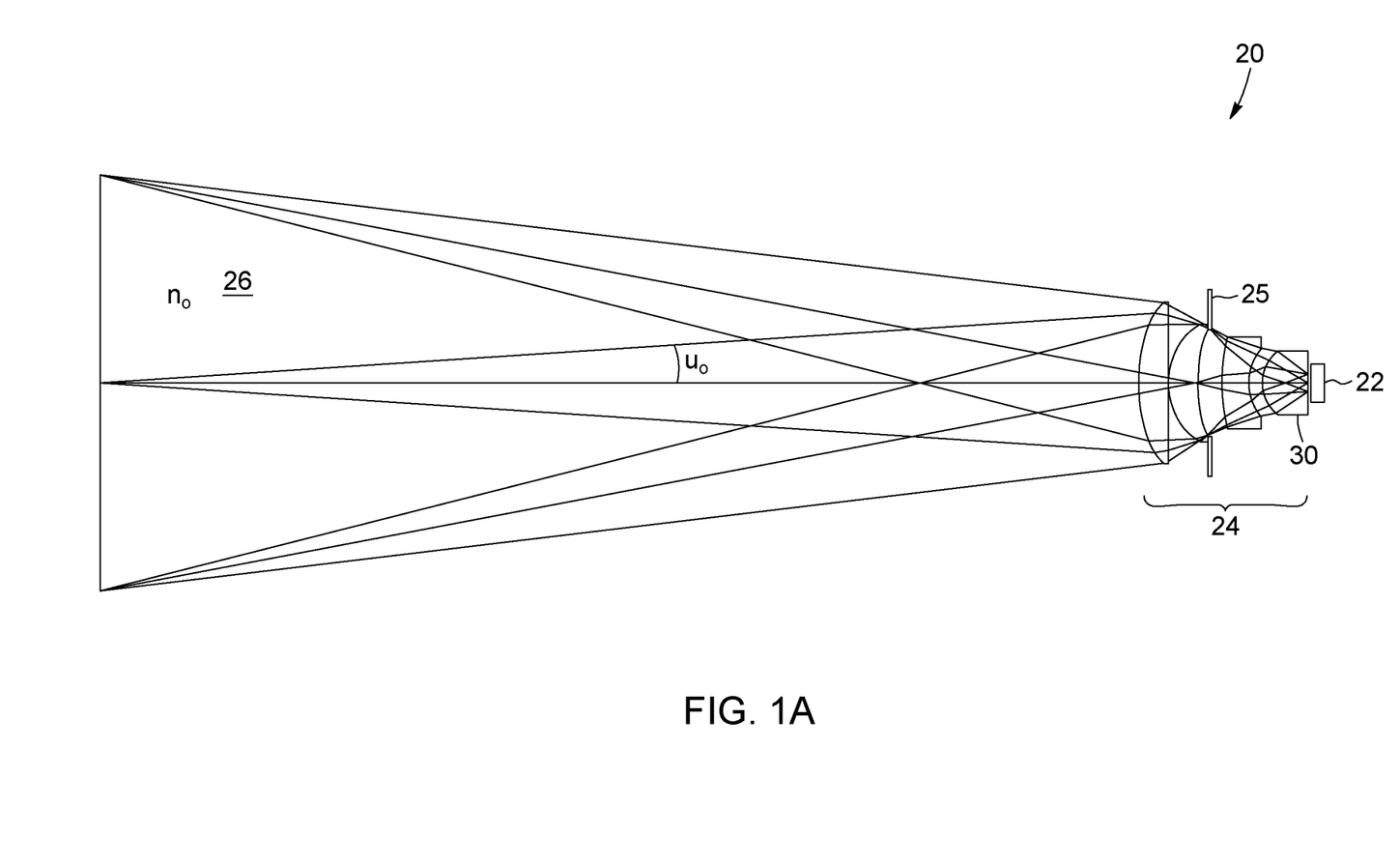
FIGS. 1A and 1B schematically illustrate the components of an imaging system according to one embodiment and trace trajectories of light rays entering the imaging system.
Figure 1B:
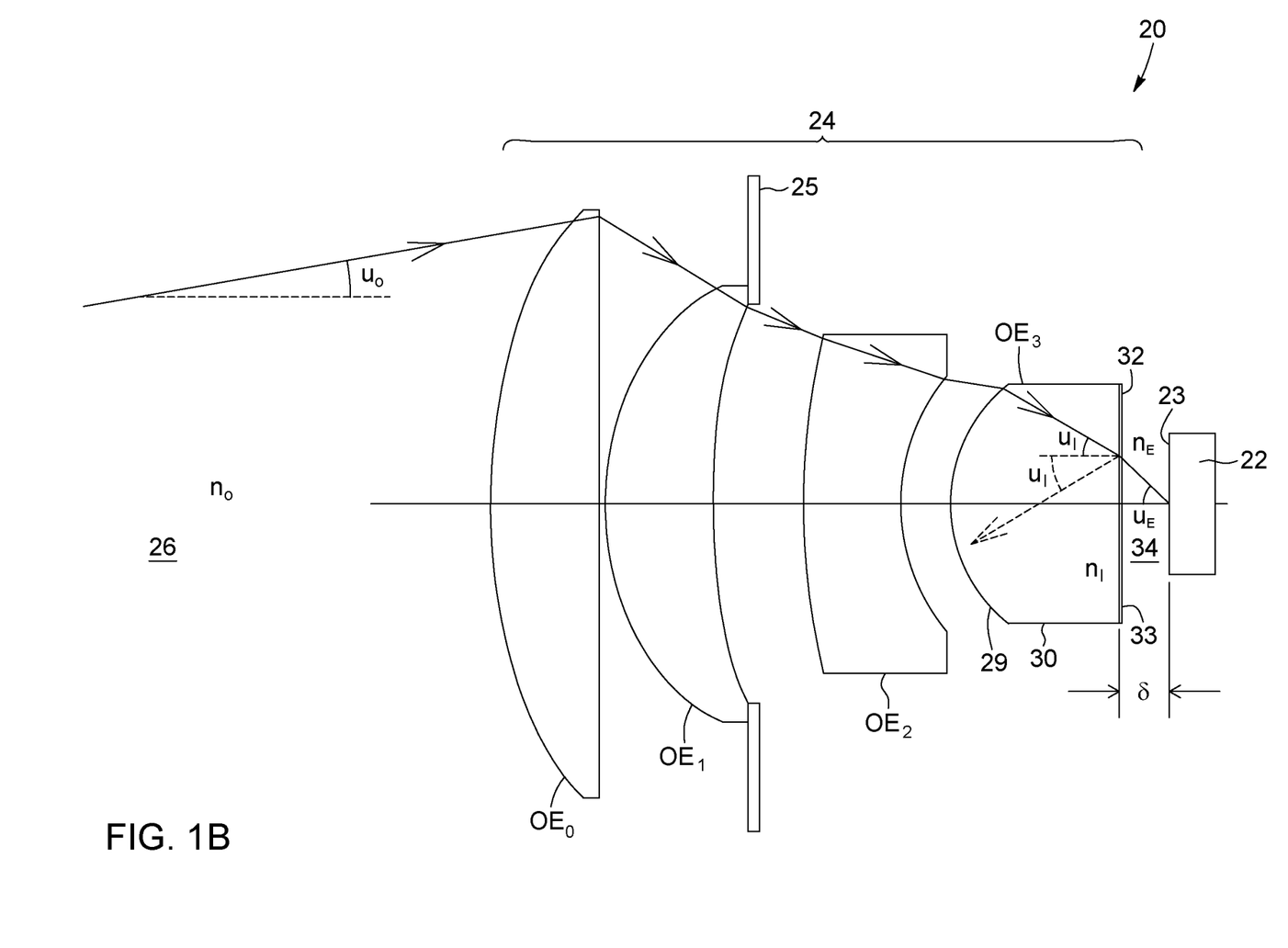

In accordance with one aspect, and as schematically illustrated in FIGS. 1A and 1B, there is provided an imaging system 20 for imaging a scene 26.

The imaging system 20 generally includes an image sensor 22 for capturing images of the scene 26 from light within the sensor spectral range. The image sensor 22 has a sensing surface 23 on which images of the viewed scene 26 are brought into focus. An imaging optics 24 is optically coupled to the image sensor 22 and configured to form the images of the scene 26 onto the sensing surface 23 of the image sensor 22. The imaging optics 24 includes a sensor-adjacent optical element 30 having an exit surface 32 located in close proximity to the sensing surface 23 of the image sensor 22. As explained in details further below, the exit surface 32 and the sensing surface 23 are spaced apart by a gap 34 having a gap width δ enabling evanescent-wave coupling from the exit surface 32 to the sensing surface 23 for light having wavelengths within the sensor spectral range.

FIGS. 1A and 1B illustrate the basic configuration of an imaging system 20 according to some implementations. As mentioned above, the imaging system 20 generally includes an image sensor 22 and an imaging optics 24. In typical implementations, the image sensor 22 may be embodied by a two-dimensional array of micro-bolometers. The expressions "bolometric" and "bolometer" are understood to refer to thermal detectors that operate by absorbing incident electromagnetic radiation and converting the absorbed radiation into heat. A typical array of micro-bolometers generally has a sensing surface 23, forming a sensor plane, including a plurality of pixels wherein each pixel includes a thermistor. A thermistor is a resistive element whose electrical resistance changes in response to temperature variations caused by the absorbed radiation. This physical property is used to sense the energy or power carried by the optical radiation incident on the bolometer. The thermistor is generally thermally insulated from an underlying substrate and from its surroundings to allow the absorbed incident radiation to generate a temperature change in the thermistor while remaining mostly unaffected by the temperature of the substrate and surroundings.

In some implementations, each pixel of the image sensor 22 may include a suspended platform, a support structure configured to hold the platform above the substrate, and a thermistor disposed on the platform. The suspension of the platform above the substrate provides thermal isolation of the thermistor to enhance the detection sensitivity of the micro-bolometer pixel. The thermistor may be embodied by any suitable material, structure, or device having an electrical resistance that changes as a function of its temperature in a predictable and controllable manner. Non-limiting examples of thermistor materials include vanadium oxide and amorphous silicon. The micro-bolometer pixels may be fabricated using common integrated-circuit and microfabrication techniques, such as surface and bulk micromachining. The micro-bolometer pixel may be characterized by its thermal time constant, $\tau=C/G$, which is given by the ratio of the heat capacity C of the micro-bolometer pixel to the thermal conductance G between the micro-bolometer pixel and its environment. The thermal time constant $\tau$ is a measure of how quickly the micro-bolometer pixel can react to a sudden change in the level of incoming radiation. Typical micro-bolometers have a thermal time constant ranging from about 2 to about 25 milliseconds (ms). The theory, operation, and applications of micro-bolometer arrays are generally known in the art, and need not be described in detail herein other than to facilitate an understanding of the present techniques.

The image sensor may further include a readout circuitry configured to measure changes in the electrical resistance of the thermistor of each micro-bolometer pixel and to provide an electrical output signal (e.g., a voltage and/or a current) whose amplitude is representative of the measured changes in electrical resistance. The readout circuitry may include a number of passive and/or active components (e.g., analog-to-digital converters, buffers, integrators, timing components) and may be implemented using a variety of circuit architectures and designs.

Although the description below refers to applications using bolometric sensors, it will be readily understood that the imaging systems described herein may be used in conjunction with different types of sensors or detectors such as, for example and non-limitatively, CCDs, CMOS, cooled detectors (MCT, InGaAs and the like), antenna detectors as well as detectors based on metamaterials.

Embodiments of the imaging systems described herein may be particularly useful in the context where the detected electromagnetic radiation has a long wavelength compared to visible light, for example corresponding to optical frequencies in the terahertz (THz), including sub-terahertz, and neighboring ranges including infrared and very long wave infrared. In some implementations, the sensor spectral range may encompass wavelengths in the micrometer to millimeter range. The expression "terahertz range" is generally understood to cover optical frequencies from about 10 GHz (wavelength of about 30 mm) to 3 THz (wavelength of about 1 mm), although this definition may vary according to applicable standards and considerations associated with a particular field of application. Although the description below uses terahertz imaging as an example, it will be readily understood that the configurations described herein may be used in different contexts such as for example imagers in the visible range, infrared range, radar range and the like.

Still referring to the example of configuration shown in FIGS. 1A and 1B, in some implementations, the imaging optics 24 includes a train of optical elements $OE_0$, $OE_1$, . . . $OE_i$, . . . $OE_N$, the last optical element of this train defining the sensor-adjacent optical element 30. The imaging optics 24 therefore forms an optical train from the scene 26 being observed, defining an object space, to the sensing surface 23 of the image sensor 22. The imaging optics 24 may include optical elements of various types acting on light in some fashion, for example to direct or change the direction of a light beam, focus or expand, collimate, filter, or otherwise transform or affect light. Examples of optical elements include lenses of any type, such as for example, plano-convex, biconvex, plano-concave, biconcave, positive or negative meniscus lenses, or cemented doublet or triplet lenses of the types listed above. In the examples illustrated in FIGS. 1A and 1B a cascade of four lenses $OE_0$, . . . $OE_3$ is shown, but it will be readily understood that this configuration is shown for illustrative purposes only and that a different number of optical elements arranged in a variety of different configurations may be used without departing from the scope of protection. In some implementations, the imaging optics 24 is configured to enable the terahertz imaging of a relatively wide scene with a large reduction factor onto the image sensor. Preferably, the optical elements OE of the imaging optics 24 are selected and disposed to collectively produce the appropriate optical power (inverse of the effective focal length) in view of the desired magnification and to control the geometrical aberrations. In some implementations, the optical elements of the imaging optics preferably transform the numerical aperture of the cone of rays accepted by the system from an object point into a cone of rays converging with a larger numerical aperture inside the last optical element of the cascade.

Referring to FIGS. 1A, 1B, 2A and 2B, one skilled in the art will readily understand that in the illustrated configuration, the numerical aperture of the system in its object space is $n_o \sin(u_o)$ while the counterpart in the image space is $n_I \sin(u_I)$. The concept of the numerical aperture (NA) can be understood with reference to FIGS. 1A and 1B. The beam of radiation coming from the point located at the center of the object plane is truncated due to the finite sizes of the optical elements of the optical train. Typically, the extent of the beam is controlled by an aperture stop 25 (iris). At the exit of the optical system, the truncated beam converges toward the image plane. The beam has the shape of a cone on both the object and the image sides, with its apex located respectively on the center point of the object plane and the center point of the image spot. By definition, the numerical aperture in a given space of the optical system is the product of the index of refraction n of the space with the sine of the angle u of the marginal ray, that is, the ray that passes from the center of the object to the outer aperture of the lens limiting the corresponding space. Hence, the object space NA of the system is $n_o \sin(u_o)$ where $n_o$ is the refractive index of the medium filling the object space. The image space NA of the imaging system is defined in the same manner as $n_I \sin(u_I)$ where $n_I$ is the refractive index of the image space medium and $2u_I$ is the cone angle of the beam converging to the image spot.

Optical Rays Analysis

Figure 2A:
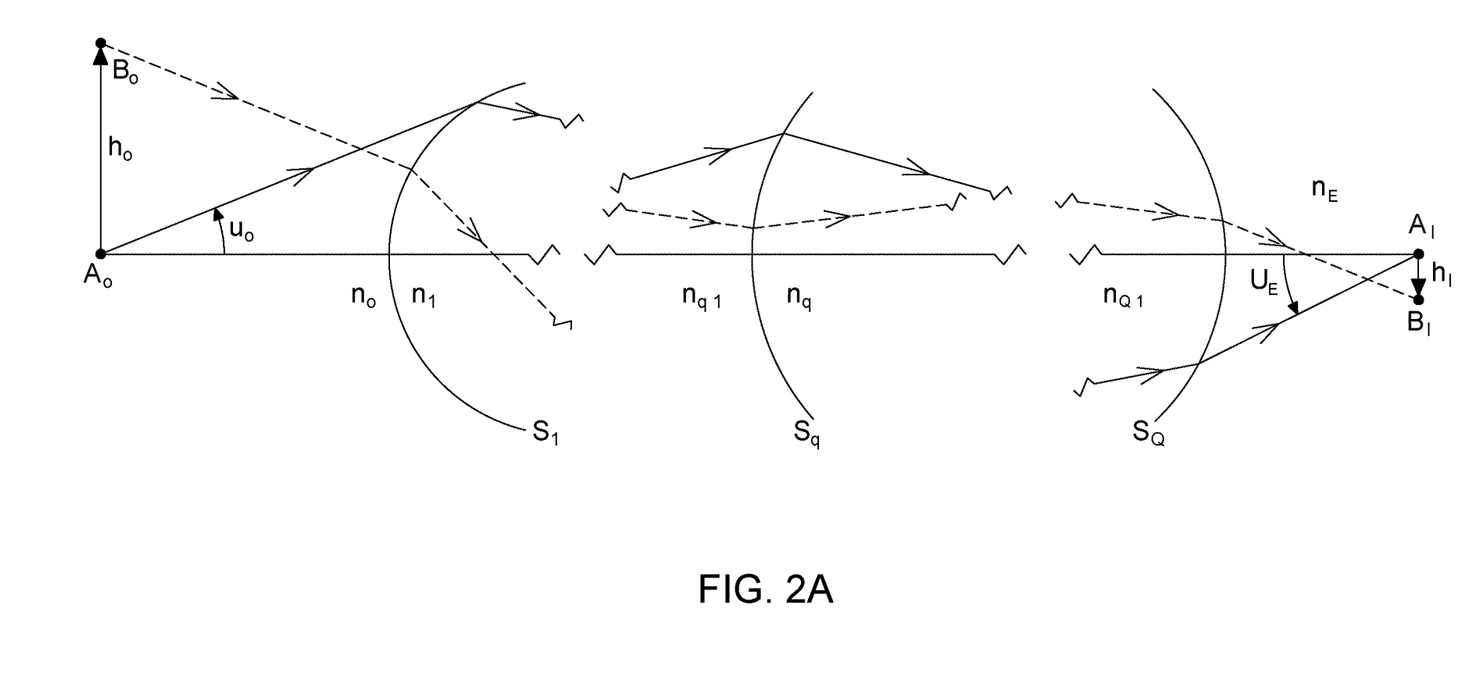
FIGS. 2A and 2B graphically represent the propagation of some specific light rays through an arbitrary centred train of optical elements.
Figure 2B:
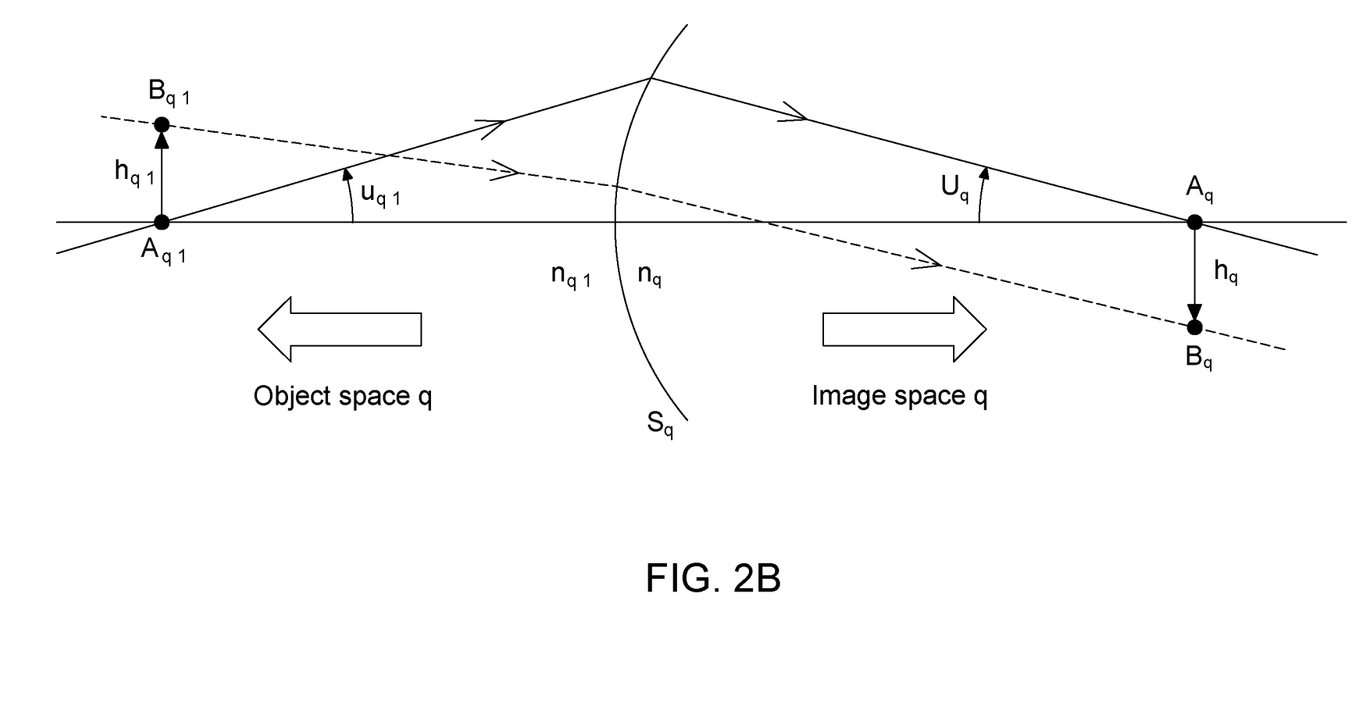

Referring to FIGS. 2A and 2B, there is shown an arbitrary centred optical train with its optical surfaces identified by the letter $S_q$, the subscript integer q indicating the order of the surface in the optical train. As mentioned above, the limiting resolution in the image space of an imaging system depends only on diffraction and is thus proportional to the wavelength of the travelling light and inversely proportional to the numerical aperture of the image space. In the optical context, each optical surface $S_q$ delimitates two spaces, an object space extending from an infinite distance on the incident side up to the optical surface $S_q$, and an image space extending from the optical surface $S_q$ to an infinite distance on the transmitted or reflected side. In FIG. 2A, the marginal ray (solid line) is traced from the centre point $A_o$ of the object plane and intersect the aperture stop 25 (see FIG. 1A) at its edge. The principal ray (dotted line) is traced from the edge point $B_o$ of the object plane in a direction that brings it to pass in the centre of the aperture stop.

In the illustration of FIG. 2A, the schematic of the optical train is truncated after the first surface $S_1$ and before the last surface $S_Q$ for simplification purposes. The spaces around the $q^{th}$ surface are illustrated in FIG. 2B. The index of refraction in the downstream space, i.e. the image space (IS) of the $q^{th}$ surface $S_q$ is $n_q$ and the upstream or object-space (OS) counterpart is the index $n_{q-1}$. The angle of the marginal ray in the IS of the surface $S_q$ is $u_q$ while its object-space counterpart is $u_{q-1}$. The marginal ray intersects the optical axis at points $A_{q-1}$ and $A_q$ in the object and image spaces of the surface $S_q$. Those points are conjugate with the object axial point $A_o$ since all of them are intersected by the axial ray which propagates along the optical axis. The principal ray intersects at point $B_{q-1}$ the plane perpendicular to the optical axis that contains the axial point $A_{q-1}$ with the counterpart $B_q$ for the image space. Those two points $B_{q-1}$ and $B_q$ are conjugate to the object point $B_o$ since points $A_{q-1}$ and $A_q$ are conjugate to $A_o$ and they are therefore each other conjugate. The arrow between points $A_q$ and $B_q$ thus represents an intermediary image of the object represented by the arrow between object points $A_o$ and $B_o$. This intermediary image is produced by the optical surface $S_q$ together with all the surfaces located upstream. The height of the object is $h_o$ while the height of intermediary image after the surface $S_q$ is $h_q$. Also, the intermediary image produced by $S_q$ is the object for the next surface $S_{q+1}$ which produce another intermediary image. The concept of the object space and image space NA enumerated for an imaging system can be generalized for each of the optical surfaces that composes the system. Hence, the object and image space NA for the optical surface $S_q$ are defined as $n_{q-1} \sin(u_{q-1})$ and $n_q \sin(u_q)$, respectively.

In the paraxial conditions where all the rays propagate along directions nearly parallel to the optical axis, the value of the product $h_q\, n_q\, u_q$ (angle $u_q$ expressed in radians) is preserved in all the spaces of the imaging system. This intrinsic characteristic is called the optical invariant. This optical invariant can be extended beyond the paraxial domain using the Abbe sine condition that must be respected for well corrected imaging systems. The extension of the optical invariant derived from the Abbe sine condition to the spaces of the $q^{th}$ surface gives $h_{q-1}\, n_{q-1}\, \sin(u_{q-1}) = h_q\, n_q\, \sin(u_q)$ where the problem of the signs for the parameters is not considered. By recursion, this optical invariant applied bilaterally from the surface $S_q$ conducts to the main results, $$h_o NA_o = h_o n_o \sin(u_o) = h_I n_I \sin(u_I) = h_I NA_I \qquad \text{E1.}$$

Considering that the lateral magnification M of the imaging system is the ratio $h_I/h_o$, then $$NA_I = n_I \sin(u_I) = \frac{h_o NA_o}{h_I} = \frac{NA_o}{M} = \frac{n_o \sin(u_o)}{M}. \qquad \text{E2}$$

According to the Sparrow criterion, the limiting resolution $r_I$ in the image space is given by the following well-known equation, $$r_I = \frac{\lambda_o}{2 NA_I} = \frac{\lambda_o}{2 n_I \sin(u_I)}. \qquad \text{E3}$$

where $\lambda_o$ is the wavelength of the illumination radiation in vacuum. The frequency of an optical radiation does not change when it travels into different media but its speed does change. The speed is determined by the ratio of the wavelength to the time for a period or equivalently by the product of the wavelength and the frequency.

$$v_m = \lambda_m f \begin{cases} v_m & \text{speed in the medium} \\ \lambda_m & \text{wavelength in the medium} \\ f & \text{frequency} \end{cases} \qquad \text{E4}$$

In the case where the radiation is propagating in vacuum, equation E4 is written as $c = \lambda_o f$ where c is the speed of light in vacuum. The definition of the refractive index n of a material is the ratio of c by the speed v of the radiation in the material. Therefore, the wavelength $\lambda_m$ in the material is $\lambda_o/n$ and equation E3 can be rewritten as $$r_I = \frac{\lambda_o}{2 NA_I} = \frac{\lambda_o}{2 n_I \sin(u_I)} = \frac{\lambda_m}{2 \sin(u_I)}. \qquad \text{E5}$$

Equation E5 emphasizes the interest of increasing the numerical aperture in the image space of the imaging system to improve the limit of resolution, namely to get a lower value of $r_I$. Equation E5 also puts the emphasis on the interest of having a high refractive index in the image space in order to reduce the wavelength in the medium and by way of consequence to improve the limit of resolution.

Light Coupling Between Imaging Optics and Image Sensor

Referring back to FIGS. 1A and 1B, in normal conditions when the gap 34 in front of the image plane is much larger than the wavelength of the light, it follows from the considerations above that the limiting resolution of the imaging system 20 depends on the refractive index $n_I$ of the medium that fills the gap 34 between the sensor-adjacent optical element 30 and the image sensor 22. In the case where this medium is air or vacuum, the maximum value for the numerical aperture in the image space is $\sin(\pi/2) = 1$. For wavelengths corresponding to the terahertz range and the like, this leads to a high value for the limiting resolution. One known approach to improve the limiting resolution is to fill the image space with a medium having a refractive index higher than that of the air. The technique known as immersion microscopy or immersion optics takes advantage of this approach. Such a solution is not, however, practical or even available for all imaging applications. Immersion microscopy requires correctly designed microscope objectives with the refractive index of the front lens selected close to the refractive index of the immersion liquid. Moreover, immersion microscopy with high NA is restricted to high magnification applications as indicated by equation E2. Finally, filling the gap with a high index medium is not compatible with other parameters of typical Terahertz imaging applications. In order to get a useful signal from a bolometric imaging sensor, the pixels (micro-bolometer elements) should be isolated from the environment in a manner that most of heat exchange is done through radiative mechanisms and that heat transfer by conduction and convection be as low as possible. For these reasons, bolometric imaging sensors must be encapsulated into a hermetic package in a vacuum environment. Hence, the immersion technique is not compatible with bolometric image sensors.

In accordance with one implementation, the sensor-adjacent optical element 30, that is, the last optical element $OE_N$ traversed by light travelling through the imaging optics 24, has a flat second surface extending parallel to the sensing surface of the image sensor, which corresponds to the exit surface 32 of the imaging optics. In some implementations, as for example shown in FIG. 1B, the sensor-adjacent optical element 30 is or includes a lens having such a flat surface 32 on the side of the image sensor and a truncated ball profile 29 on the side opposite to the image sensor. The truncated ball profile may have a spherical, conical or aspherical shape. By way of example, such a lens may be embodied by an Amici lens or a Weierstrass lens. Both types of lenses have a shape defined by a sphere truncated by a plane surface. The plane surface includes the center of the sphere for the Amici lens while the length (length of the segment perpendicular to the plane surface and passing by the center of the sphere) of the Weierstrass lens is $(1+1/n)$ times the radius $r_w$ of the sphere, where n is the index of refraction of the material composing the sphere.

As mentioned above, the gap 34 between the exit surface 32 and the sensing surface 23 has a gap width $\delta$ that enables evanescent-wave coupling from the exit surface 32 to the sensing surface 23. The gap width $\delta$ may be similar to or smaller than a penetration distance of evanescent-waves for light having wavelengths within the sensor spectral range, thus enabling a transfer of optical power from the exit surface to the sensing surface by evanescent-wave coupling.

Evanescent-Wave Coupling

Transverse electromagnetic waves such as THz waves are solution to the well-known Maxwell equations. In homogeneous, isotropic and nonmagnetic dielectric medium, each of the x, y and z components of the electric or magnetic fields corresponding to an electromagnetic wave can generally be expressed mathematically using the phasor representation:

$$V(x,y,z,t) = U(x,y,z)e^{-j2\pi ft} = [A(x,y,z)e^{j\varphi(x,y,z)}]e^{-j2\pi ft} \quad \text{E6.}$$

where $j \triangleq \sqrt{-1}$ and the position dependent real functions $A(x,y,z)$ and $\varphi(x,y,z)$ are respectively the amplitude and the phase of the wave while f in the harmonic time-dependent part of the component is the frequency of the fields variation with t representing the time. The complex valued function $U(x,y,z)$ is called the complex amplitude. Any component $F(x,y,z,t)$ of the fields is the real part of its phasor representation.

Considering that the referential is oriented in a manner that the direction of the propagation of the wave is along the z axis. Let consider the complex amplitude corresponding to a component of a field in the plane z=0. In a specific plane, the complex amplitude depends only on the x and y coordinate and the complex amplitude is written as $U(x,y;0)$. Since the complex amplitude $U(x,y;0)$ represents a physical phenomenon, then its Fourier transform $W(u,v;0)$ is likely to exist. Therefore, following Fourier transform relationships:

$$U(x, y; 0) = \iint_{-\infty}^{\infty} W(u, v; 0)e^{j2\pi(xu+yv)} du dv \quad \text{E7}$$

$$\text{with } W(x, y; 0) \triangleq \int_{-\infty}^{\infty} U(u, v; 0)e^{j2\pi(xu+yv)} du dv.$$

Posing $\alpha = \lambda_m u$, $\beta = \lambda_m v$ and $\gamma = \sqrt{1 - (\lambda_m^2 u^2 + \lambda_m^2 v^2)}$, then $$U(x, y; 0) = \frac{1}{\lambda_m^2} \iint_{-\infty}^{\infty} W\left(\frac{\alpha}{\lambda_m}, \frac{\beta}{\lambda_m}; 0\right)\left[e^{j\frac{2\pi}{\lambda_m}(x\alpha+y\beta+z\gamma)}\right]_{z=0} d\alpha d\beta. \quad \text{E8}$$

The argument of the integral takes the form of a complex amplitude with amplitude $$W\left(\frac{\alpha}{\lambda_m}, \frac{\beta}{\lambda_m}; 0\right)$$

and phase $\varphi(x,y,z) = \alpha x + \beta y + \gamma z$. Such a complex amplitude corresponds to the field of a plane wave propagating in the direction defined by the direction cosines $\alpha$, $\beta$ and $[1-(\alpha^2+\beta^2)]^{1/2}$, provided that $\lambda_m$ represents the wavelength of the wave in the propagation medium. Then the complex amplitude $U(x,y;0)$ is the superposition of an infinite number of plane waves. The integral EqX sum is referred as the decomposition into the spectrum of plane waves of the complex amplitude. The complex amplitude in any other plane can be computed by propagating the individual plane waves of its spectrum and summing them. The validity of the decomposition into the spectrum of plane waves for a field perturbation imaged by an optical system is that image space NA is large in comparison with $\sqrt{\lambda_m/d}$, where d is the distance between the exit pupil and the image plane. It is considered that the optical design of the system is done in a manner that the validity criteria is satisfied.

The component of the field perturbation within the last lens of the optical train just prior to the flat surface can be decomposed into its spectrum of plane waves. The spectrum of direction of the plan waves is comparable to those of the rays within the last lens. Those plane waves are then refracted at the interface with the gap between the last flat surface and the image sensor. Since the normal to the interface is along the z-axis, then the z direction cosine of an incident plane wave is the cosine of the angle of incidence. In polar coordinate, the propagation direction of the refracted plane wave is given by the unit vector $$\hat{r} = \frac{1}{n_g}\left[n_I \sin\theta\cos\sigma, n_I\sin\theta\sin\sigma, \sqrt{n_g^2 - n_I^2 \sin^2\theta}\right],$$

$\sin\theta\cos\sigma$, $n_I\sin\theta\sin\sigma$, $\sqrt{n_g^2 - n_I^2\sin^2\theta}$], where $\theta$ is the angle of incidence, $\sigma$ is the azimuth angle of the plane of incidence, $n_I$ and $n_g$ are the refractive index respectively of the last element and the gap between last element and the image sensor. Replacing the direction cosines of the refracted vector into the phase term of the complex amplitude of the refracted plane wave:

$$U_g(x, y, z) = t(\theta)W\left(\frac{\alpha n_g}{\lambda_o}, \frac{\beta n_g}{\lambda_o}; 0\right)e^{j\frac{2\pi z}{\lambda_o}[n_g^2 - n_I^2\sin^2\theta]^{1/2}} e^{j\frac{2\pi n_I \sin\theta}{\lambda_o}(x\cos\sigma + y\sin\sigma)}. \quad \text{E9}$$

In the last equation, $t(\theta)$ is the Fresnel amplitude coefficient of transmission and $n_g\lambda_m$ is replaced by the wavelength in vacuum $\lambda_o$ since the ratio of the wavelength $\lambda_o$ in the vacuum to the counterpart $\lambda_m$ in a medium is equal to the refractive index n of the medium. The equation E9 corresponds to a transverse wave as long as $n_I \sin \theta \leq n_g$. In the contrary when $n_I > n_g$ and the angle of incidence $\theta$ is larger than the critical angle $\theta_c = \sin^{-1}(n_g/n_I)$, the variation of the phase takes part only along the x-y plane and the term in z describes an exponential variation of the amplitude that decays with the distance from the interface. At a distance $z_e = \lambda_0/(2\pi[n_i^2 \sin \theta - n_g^2]^{1/2})$ from the interface, the amplitude of the field is reduced by a factor 1/e with respect to the amplitude at the interface. Therefore, when $n_I \sin \theta > n_g$, the transmitted wave is confined within a region close to the interface and is therefore an evanescent-wave. The condition $n_I \sin \theta > n_g$ is referred as condition of the total internal reflection since all the energy goes in the reflected wave. The distance $z_e$ is referred as the penetration distance of the evanescent-wave.

As demonstrated both experimentally and by complete theoretical development, evanescent-waves exist and a fluctuating electromagnetic field is created in the vicinity of a refracting interface in the condition of total internal reflection. The evanescent-wave is the consequence of the requirement for the continuity of the electromagnetic field at the interface. A rigorous study of the phenomenon shows that there is no net flow of energy produced by the evanescent-waves, but just a back-and-forth flow of energy through the interface at all times with null time-average. This is true as long as no perturbation elements are present within a distance of a few wavelengths from the interface, namely in the region where the amplitude of the evanescent field is not negligible. Otherwise, the evanescent field will interact with the perturbation elements, and this may result in the excitation of waves within the perturbation elements accompanied by a net transfer of energy and a reduction of the energy reflected by the interface. In some implementations, this phenomenon is referred to as evanescent-wave coupling.

The spectrum of plane waves can be divided in two parts when the numerical aperture $n_I \sin(\theta_{max})$ within the sensor-adjacent optical element 30 is larger than the refractive index $n_g$ of the medium that fills the gap 34. The first part includes all the plane waves with angles of incidence smaller than the critical angle $\theta_c$ that produce refracted waves and the second part includes all the others that violate the Snell law and that generate an evanescent field. However, if the width $\delta$ of the gap 34 between the exit surface 32 and the sensing surface 23 of the image sensor 22 is comparable or smaller than the shortest penetration distance (see below the critical depth of penetration) of the evanescent-waves, a fraction of the energy is transmitted across the exit surface 32 and the gap 34 up to the image sensor 22 through evanescent-wave coupling, and can therefore be absorbed by the pixels of the image sensor 22. This mechanism partially prevents total internal reflections and allows the transfer of image information to the image sensor 22, which adds to the image information transferred by the refracted (transmitted) waves. Altogether, the image information from both the transmitted waves and the evanescent-wave coupling permits image resolution close to the maximum achievable by the numerical aperture inside the sensor-adjacent optical element 30. The narrower the gap 34, the closer to the full resolution is likely to be achieved since the spot produced on the exit surface 32 by the imaging optics 24 from a point object is transferred to the sensing surface 23 of the image sensor 22 with minimal alteration. This can be explained by the fact that the evanescent-waves are transferred perpendicularly to the interface and that the propagation of the refracted plane waves over the short propagation distance does not spread the energy of the spot. The terminology 'evanescent-wave coupling' objective may be used to designate the type of imaging optics with high NA and transfer of a significant part of the incident energy to the image sensor 22 through a thin gap by evanescent-waves, as described above in this paragraph.

The transfer of energy through evanescent-wave coupling is possible only in the volume where the amplitude of the evanescent-wave is no negligible. This involves that the width $\delta$ of the gap 34 be of the order of the penetration distance $z_e$ of the evanescent-wave but ideally smaller than $z_e$. The penetration distance decreases with the angle of incidence of the evanescent-wave and the critical penetration distance is therefore the distance that corresponds to the incident plane wave with the largest angle of incidence, which is itself comparable to the angle of incidence of the marginal ray. Hence, the width of the gap 34 preferably satisfies the following criteria to get significant energy transferred to the image sensor 22

$$d \leq \lambda_0/(2\pi|n_I^2 \sin^2\theta_{max} - n_g^2|^{1/2}) \approx \lambda_0/(2\pi|NA_I^2 - n_g^2|^{1/2}) \quad \text{E10.}$$

where $NA_I$ is the numerical aperture computed from the angle of incidence of the marginal ray on the exit surface 32 within the sensor-adjacent optical element 30. The width d given by equation E100 is referred to as the critical depth of penetration of the evanescent field. For example, the critical depth of penetration in a vacuum gap ($n_g \approx 1$) for an imaging optics having a numerical aperture of 2.25 within the sensor-adjacent optical element 30 is 12.7 times smaller than the illumination wavelength $\lambda_0$ in vacuum. In this example, a gap of the order of or smaller than 80 µm would be required for imaging with light of 1-mm wavelength.

As will be readily understood by one skilled in the art, condition 0 relates to the strength of the evanescent-wave coupling of energy between the sensor-adjacent optical element 30 and the image sensor 22, and the width $\delta$ should be selected in view of the energy required at the sensing surface 23 of the image sensor 22 for a target application. In accordance with some embodiments, the exit surface 32 of the sensor-adjacent optical element 30 and the sensing surface 23 of the image sensor 22 are brought as close to each other as possible without contact, which can help optimize the evanescent-wave coupling strength. It will also be readily understood by one skilled in the art that using the present configuration in the context of terahertz imaging applications advantageously provides the benefits of evanescent-wave coupling for a greater range of gap width values than imaging applications using light of shorter wavelength.

The more efficient is the transfer of the energy from the exit surface 32 of the sensor-adjacent optical element 30 to the sensing surface 23 of the image sensor 22, the closer to the full resolution is likely to be achieved. In this condition it is of relevance that the pixels of the image sensor have a good absorption of both the transmitted and the evanescent-waves.

Considering the confinement of the evanescent-waves in the close vicinity of the exit surface 32, it should be noted that the elements of the pixels in which the interaction with the evanescent-waves takes part are preferably located at the very top of the pixel. The top element of the image sensor 22 could be a dielectric layer in which propagation waves are excited by the evanescent-waves. The propagating waves are then absorbed by an absorption layer beneath the dielectric layer. The top element could also be a thin layer of Metal blacks such as a gold black. Metal blacks are produced in a low-vacuum process in a manner to obtain a porous nano-structured film with low conductivity and a broad particle-size distribution. Metal blacks absorb electromagnetic radiation, which results in changes of its temperature.

With reference to FIG. 1B, in some embodiments the sensor-adjacent optical element 30 includes an anti-reflection (AR) coating 33 deposited on the exit surface 32. As will be readily understood by one skilled in the art, another factor impacting the transfert of energy to the image sensor 22 is the transmission at the exit surface 32. Since the refractive index of the sensor-adjacent optical element 30 should be large enough to give a high numerical aperture in the image space, then significant optical losses are expected for the refracted waves due to the Fresnel reflections. For example, the Fresnel reflection (in intensity) at normal incidence from the inside of the optical element 30 made of a material with refractive index of 3.4 to a vacuum gap is about 30% of the incident wave power. The losses due to the Fresnel reflection increase exponentially for angles of incidence just below the critical angle $\theta_c$ to reach 100% at this angle. The addition of a quarter-wave single layer AR coating can improve significantly the transmission of the refracted waves, but it does not change the critical angle nor the proportion of evanescent-waves within the gap 34. The thickness of the AR coating must be significantly less than the penetration depth of the evanescent-waves if the conditions are favorable for the generation of evanescent fields within the AR coating or the refractive index of the AR coating layer must be large enough to avoid the generation of evanescent-waves within the coating medium. The last option imposes a limit on the numerical aperture $NA_I$ within the optical element 30 since $NA_I = n_I \sin \theta_{max}$ must be smaller than the refractive index $n_L$ of the AR layer. On the other hand, if evanescent-waves are allowed within the AR layer, then the worst penetration depth of those waves within the AR coating is for the wave with the largest angle of incidence. Therefore, the critical depth of penetration is $d_c = \lambda_0/(2\pi[NA_I^2 - n_L^2]^{1/2})$. However, a single layer AR coating must have a thickness $t_{AR}$ around $\lambda_0/(4n_L)$ to reduce efficiently the reflections. If a condition is imposed on the thickness of the AR layer such that $t_{AR} < F\ d_c$ with $0 < F < 1$, then this imposes the following condition on the numerical aperture, $$n_L < NA_I < \frac{n_L}{\pi}\sqrt{4F^2 + \pi^2}.$$

In some implementations, the optical elements of the imaging optics 24 may be made of materials which enhance the resolution of the imaging system 20. The higher is the index of refraction of the sensor-adjacent optical element 30, the higher is the potential offered by the imaging system to achieve high resolution. In some implementations, the sensor-adjacent optical element is made of a material having a refractive index higher than about 2 for wavelengths within the sensor spectral range. For example, High Resistivity Float Zone Silicon (HRFZ-Si) presents a good internal transmission for THz radiation and has a quite high index of refraction of about 3.4. Such a material is advantageous for the THz evanescent-wave coupling imaging optics since it offers numerical apertures much higher than 1, likely in the range of 2 to 3.

Packaging Assembly

With reference to FIGS. 3A to 5, in some implementations the imaging system 20 includes a packaging assembly 50 housing the image sensor 22, the packaging assembly 50 having an opening 52 aligned with the sensing surface 23. In typical implementations, the packaging assembly 50 provides and maintains the physical relationship between the sensor-adjacent optical element 30 and the image sensor 22. Amongst considerations of interest, the proximity and alignment of the exit surface 32 with the sensing surface 23 are to be considered, as well as the fact that bolometric sensors and the like operate in a vacuum environment.

Figure 3A:
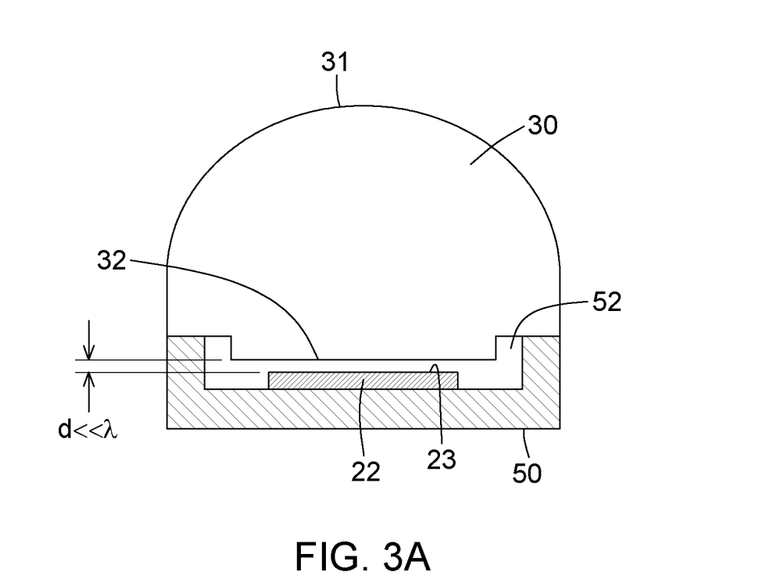
FIG. 3A is a schematical cross-sectional side view of a sensor-adjacent optical element and image sensor configuration according to one embodiment.
Figure 3B:
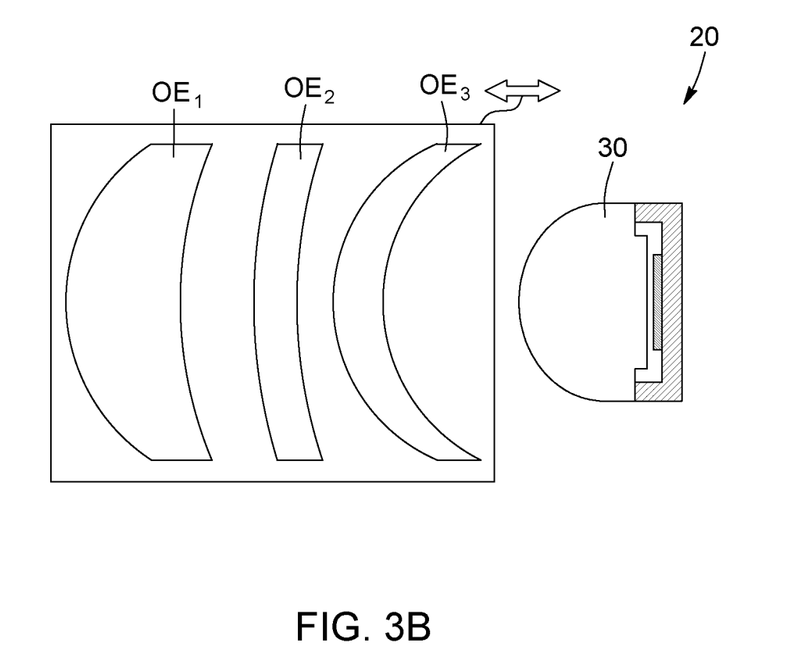
FIG. 3B illustrates how the images formed on the surface of the image sensor can be brought into focus by translating a group of optical elements.

With reference to FIG. 3A, there is shown one embodiment in which the sensor-adjacent optical element 30 is affixed to the packaging assembly 50 so as to seal the opening 52. The sensor-adjacent optical element 30 is thereby used to seal a package of the image sensor 22. In this option, the position of the sensor-adjacent optical element 30 is fixed with respect to the sensor plane defined by the sensing surface 23. The imaging system 20 can be brought into focus through an axial translation of the entire imaging system 20, that is, by displacing as a whole the system 20 in a manner that the object plane of the system is made coincident with the scene. Alternatively, as for example illustrated in FIG. 3B, focusing may be performed through axial translation of one or more of the optical elements $OE_1$, $OE_2$, ... $OE_{N-1}$ of the imaging optics upstream the sensor-adjacent optical element 30. These optical elements may be translated individually, as a group or as sub-groups.

Figure 4:
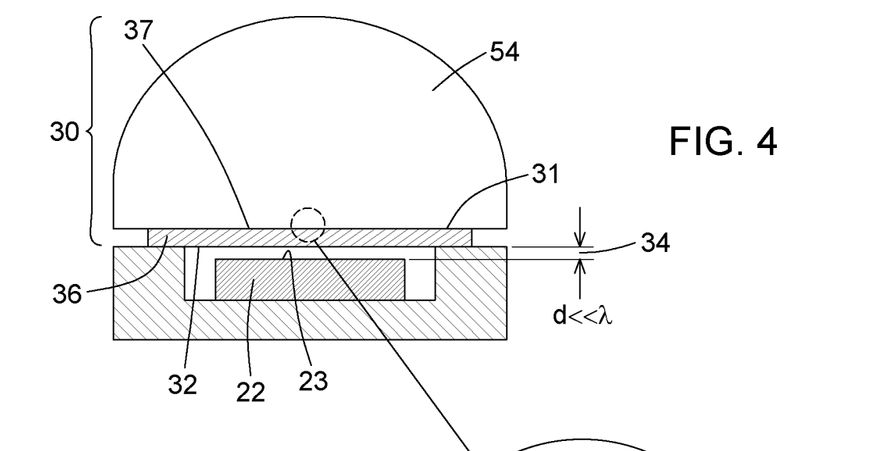
FIG. 4 is a schematical cross-sectional side view of a sensor-adjacent optical element and image sensor configuration according to another embodiment.
Figure 4A:
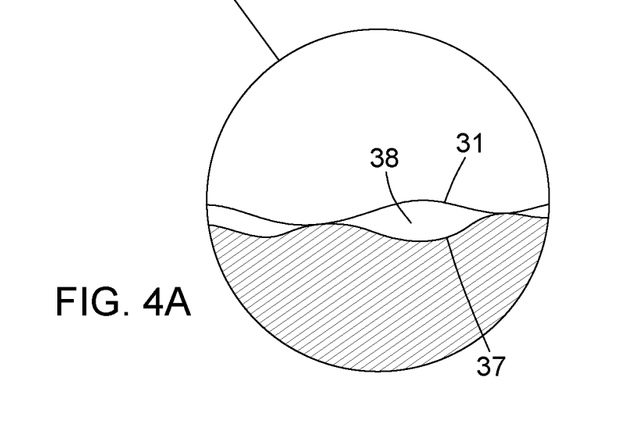
FIG. 4A is an enlarged view of a section of FIG. 4.

In some implementations, the sensor-adjacent optical element 30 is a compound optical element. For example, referring to FIG. 4, there is shown another variant in which a sensor window 36 affixed to the packaging assembly 50 and sealing the opening, and a last lens 54 of the imaging optics is affixed to this sensor window 36 and forms a continuous light path therewith. In this variant, the sensor window 36 is integral to the sensor-adjacent optical element 30, and its surface on the side of the image sensor 22 therefore defines the exit surface 32. The sensor window 36 is preferably made of a material having an index of refraction very close to the index of the material used for the manufacturing of the lens 54, so that light can travel from one to the other without losses due to total internal reflection or Fresnel reflection and to maintain the high NA in the image space. A good flatness of the surface 31 of the lens 54 and the surface 37 of the sensor window 36 in contact with each other is preferable to ensure an efficient energy transfer at the interface. It will however be understood that optical surfaces may not be perfectly flat, and that imperfections in either surface 31 or 37 may lead to the formation of voids 38 therebetween which are small enough to allow a portion of the light energy to be transferred through by evanescent-wave coupling, as shown in FIG. 4A. The thicknesses of both the lens 54 and the sensor window 36 are preferably designed to get an overall length close to the nominal value of the optimal central thickness for an ideal single piece exit lens 30. Focusing can be performed in similar manners as described above with respect to the embodiments of FIGS. 3A and 3B.

Figure 5:
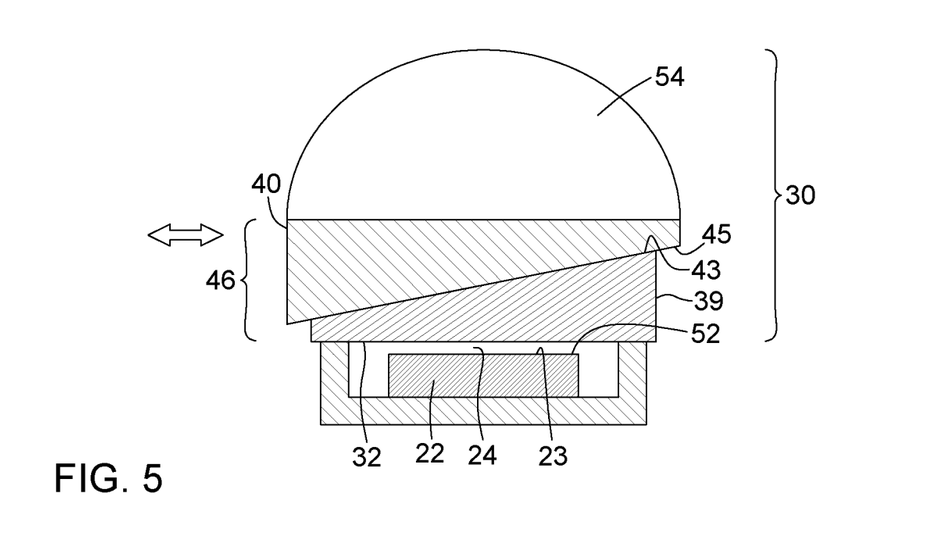
FIG. 5 is a schematical cross-sectional side view of a sensor-adjacent optical element and image sensor configuration according to yet another embodiment.

Referring to FIG. 5, there is shown another example of embodiment in which the sensor-adjacent optical element 30 is a compound optical element. In this case, the sensor-adjacent optical element 30 includes a prismatic assembly 46 including a wedge-shaped sensor window 39 having a flat surface 42 defining the exit surface 32 of the sensor-adjacent optical element 30, extending parallel to the sensing surface 23 of the image sensor 22 and affixed to the packaging assembly 50 so as to seal the opening 52. The prismatic assembly 46 also includes a wedged plate 40 slidably engaging the wedge-shaped sensor window 39 along respective angled surfaces 43 and 45 thereof. As with the previously described embodiment, a last lens 54 of the imaging optics is affixed to the wedged plate 40 along a flat surface 41 thereof parallel to the sensing surface 23 of the image sensor 22. The lens 54 and the prismatic assembly 46 form a continuous light path. In some variants, the wedged plate 40 is identical to the wedge-shaped sensor window 39 and they are placed complementary to each other in a manner that the assembly of both wedged elements 39, 40 forms a plate with parallel outer faces. Sliding the wedged plate 40 in between and in constant contact with the lens 54 and the wedge-shaped sensor window 39 allows to change the total axial length from the vertex of the spherical surface of the lens 54 and the exit surface 32 of the compound sensor-adjacent optical element 30 defined by the flat surface of the wedge-shaped sensor window 39. The adjustment of the lateral position of the wedged plate 40 allows the optical system 20 to be brought into focus. The lens 54, the wedged plate 40 and wedged-shaped sensor window 39 may be made with materials of the same or similar index of refraction to ensure a good transfer of the rays through their common interfaces. The surfaces of the wedged plate 40 and wedge-shaped sensor window 36 may be put in direct contact with each other or very thin spacers can be used to create air gaps in between the optical surfaces. In this last case, the transfer of optical energy from one surface to the other is ensured through evanescent-waves.

Of course, numerous modifications could be made to the embodiments described above without departing from the scope of protection.

The invention claimed is:

1. An imaging system for imaging a scene, comprising:
an image sensor for capturing images of the scene from light having wavelengths within a sensor spectral range, the image sensor having a sensing surface; and
an imaging optics optically coupled to the image sensor and configured to form the images of the scene onto the sensing surface of the image sensor, the imaging optics comprising a sensor-adjacent optical element having an exit surface located in close proximity to the sensing surface of the image sensor;
wherein the exit surface of the sensor-adjacent optical element and the sensing surface of the image sensor are spaced apart by a gap having a gap width similar to or smaller than a penetration distance of evanescent-waves for light having wavelengths within the sensor spectral range, thus enabling a transfer of optical power from the exit surface to the sensing surface by evanescent-wave coupling.

2. The imaging system according to claim 1, wherein the image sensor is an array of micro-bolometers.

3. The imaging system according to claim 1, wherein the sensor spectral range comprises wavelengths corresponding to optical frequencies in the terahertz range.

4. The imaging system according to claim 1, wherein the sensor spectral range encompasses wavelengths from about 0.1 mm to about 30 mm.

5. The imaging system according to claim 1, wherein the imaging optics includes a train of optical elements, a last optical element of said train of optical elements defining the sensor-adjacent optical element.

6. The imaging system according to claim 1, wherein the exit surface is flat and extends parallel to the sensing surface of the image sensor.

7. The imaging system according to claim 1, wherein the sensor-adjacent optical element comprises a lens having a flat surface on a side of the image sensor and a truncated ball profile on a side opposite to said image sensor.

8. The imaging system according to claim 1, wherein the gap width is smaller than a critical depth of penetration of the evanescent-waves.

9. The imaging system according to claim 1, wherein the sensor-adjacent optical element is made of a material having a refractive index higher than about 2 for light having wavelengths within the sensor spectral range.

10. The imaging system according to claim 1, wherein the sensor-adjacent optical element comprises an anti-reflection coating deposited on the exit surface.

11. The imaging system according to claim 1, further comprising a packaging assembly housing the image sensor, the packaging assembly comprising an opening aligned with the sensing surface.

12. The imaging system according to claim 11, wherein the sensor-adjacent optical element is affixed to the packaging assembly so as to seal said opening.

13. The imaging system according to claim 11, wherein the sensor-adjacent optical element is a compound optical element comprising a sensor window affixed to the packaging assembly so as to seal said opening, and a lens of the imaging optics affixed to said sensor window and forming a continuous light path therewith.

14. The imaging system according to claim 11, wherein the sensor-adjacent optical element is a compound optical element comprising:
a prismatic assembly comprising a wedge-shaped sensor window having a flat surface parallel to the sensing surface of the image sensor and affixed to the packaging assembly so as to seal said opening, and a wedged plate slidably engaging the wedge-shaped sensor window along respective angled surfaces thereof; and
a lens affixed to the wedged plate along a flat surface thereof parallel to the sensing surface of the image sensor;
whereby the lens and the prismatic assembly form a continuous light path.

* * * * *